(12) United States Patent
Blackinton, Jr.

(10) Patent No.: US 6,299,810 B1
(45) Date of Patent: Oct. 9, 2001

(54) METHOD FOR MANUFACTURING A CARBON FIBER COMPOSITE

(75) Inventor: Richard E. Blackinton, Jr., Marietta, GA (US)

(73) Assignee: Michael RiCharde, LLC, Alpharetta, GA (US)

( * ) Notice: Subject to any disclaimer, the term of this patent is extended or adjusted under 35 U.S.C. 154(b) by 0 days.

(21) Appl. No.: 09/313,580

(22) Filed: May 18, 1999

Related U.S. Application Data
(60) Provisional application No. 60/086,652, filed on May 26, 1998.

(51) Int. Cl.[7] .......................... B29C 70/16; B29C 70/38; B29C 70/88
(52) U.S. Cl. .................. 264/102; 264/103; 264/137; 264/152; 264/162; 264/257; 264/258; 264/314; 264/315
(58) Field of Search .................. 264/102, 103, 264/108, 136, 137, 258, 314, 315, 257, 152, 162

(56) References Cited

U.S. PATENT DOCUMENTS

| | | | | |
|---|---|---|---|---|
| 4,474,906 | * | 10/1984 | Nakama et al. | 523/205 |
| 4,640,861 | * | 2/1987 | Binnersley et al. | 428/294 |
| 5,294,391 | * | 3/1994 | McMillin | 264/103 |
| 5,614,139 | * | 3/1997 | Cutolo et al. | 264/70 |
| 5,820,894 | * | 10/1998 | Kreutzer | 425/389 |

* cited by examiner

Primary Examiner—Jan H. Silbaugh
Assistant Examiner—Stefan Staicovici
(74) Attorney, Agent, or Firm—Womble Carlyle Sandridge & Rice, PLLC (57) ABSTRACT

A system and method of forming a carbon fiber composite material in which a series of carbon fibers are woven together and treated with a resin to form a sample or weave. The carbon fiber sample is then vacuumed, compressed and is cured to form a solid plank or board that is then cut, sanded and polished to form a finished product.

6 Claims, 9 Drawing Sheets

FIG. 8B

# METHOD FOR MANUFACTURING A CARBON FIBER COMPOSITE

CROSS REFERENCE TO PRIORITY APPLICATION

This application claims the benefit of United States Provisional Application Ser. No. 60/086,652, filed May 26, 1998.

FIELD OF THE INVENTION

The present invention relates in general to the manufacture of composites. In particular, the present invention relates to the manufacture of composites formed from a series of carbon fibers woven together and treated with a resin material to form a weave or sample that is then vacuumed, compressed, and cured to form a substantially solid carbon fiber composite for forming various products each having a unique, non-uniform, decorative appearance.

BACKGROUND OF THE INVENTION

Composite materials are increasingly being used for the manufacture of a variety of products and as building materials due to their high strength and durability and the ability to easily manufacture and machine such composites into a variety of shapes and designs. Carbon-based composites such as carbon fiber composites especially are becoming increasingly popular for use in numerous industrial applications for their high strength and stability. For example, carbon fiber composites are now being used in a variety of products such as the wings and bodies of high technology jet fighter airplanes, automobile dashboards, and smaller articles such as billiard cues.

In current industrial processes, carbon fiber composites typically are formed by winding a series of fibers about a mandrel as a resin material is applied, or by mixing the fibers and resin in a mold. The resultant sample or weave of carbon fibers is then compressed under extremely high pressures and temperatures to press the carbon fiber and resin weave or sample into a substantially solid block, and to cause the resin to cure and harden to form a substantially solid carbon fiber composite. It is critical in such industrial processes that the resultant composite materials being formed be uniform in cross-section such that the carbon fibers are required to be wound or formed with a-prescribed pattern or grain in order to preserve the strength and structural integrity of the resultant composites. Uniformity, and thus strict adherence to a prescribed pattern, is especially critical for materials used in such applications as airplane wings.

Accordingly, a high degree of precision in the winding of the carbon fibers in a specific pattern without deviation is necessary to insure the uniformity of the composite material required by conventional industrial processes. Such uniformity and adherence to a prescribed pattern results in the composites formed thereby having a substantially uniform, precise patterned appearance. Thus, such carbon fiber composites primarily are used for larger products where structural integrity is of primary concern rather than forming articles having a highly unique, decorative appearance. In addition, the pressures exerted during compression of the carbon fiber and resin sample or weave in most conventional processes generally are extremely high. Even with such high pressures and temperatures, and long cure times, most industrial processes for forming carbon fiber composites typically have as much as 50% waste or unusable material due to the failure to exhaust all air from within the carbon fiber weave, and/or to thoroughly wet the fibers.

Attempts also have been made to use a vacuum within an autoclave or pressure chamber to draw out air from within the carbon fiber weave before compressing the wo und, resin-covered fiber weave. An additional process is believed to be disclosed in the pending U.S patent application of Harold Hale, application Ser. No. 08/786,784, entitled "Method and Apparatus for Manufacture of Minimum Velocity, Wrike Free Composite Parts", which is believed to disclose the use of manufacturing composite parts in which the composite materials are encased in a vacuum bag placed in a vacuum chamber, and then a vacuum drawn on both the bag and the chamber to first draw out air from within the carbon materials and thereafter to apply pressure to the materials. While such a process appears to provide for higher quality composite products, there is still significant waste that occurs, although not on the same order as current conventional manufacturing processes. In addition, this vacuum bag method frither requires great care and precision in bagging and sealing the carbon fiber and resin weave or sample within the bag and placing the bag within the vacuum chamber, as, if the bag is not sealed or is punctured or has any defects at all, the sample will be ruined and must be discarded.

Accordingly, it can be seen that a need exists for a system and method of forming composite materials, such as carbon fiber composites, that enables a carbon fiber composite to be formed efficiently and relatively inexpensively, with the amount of waste being significantly reduced, and which firther provides the resultant carbon fiber composite with an enhanced, unique, non-uniforn, highly decorative appearance.

SUMMARY OF THE INVENTION

Briefly described, the present invention comprises a system and method for forming a carbon fiber composite material having a random, non-uniform, decorative and unique appearance for use in forming a variety of products from tabletops and flooring tiles to urns and cigar humidors.

In a first embodiment of the invention, a series of carbon fibers are fed from a creel to a lathe of a winding assembly. The size or tow of the carbon fibers typically is in the range of 1,000 to 50,000 (i.e. 1,000 to 50,000 individual strands per bundle or tow) and generally between 5 to 20 spools are used to feed fibers of varying sizes to the winding assembly. The winding assembly includes a lathe having an elongated collection trough or basin, and a carriage that is reciprocably movable along the length of the trough. The carbon fibers are fed to the carriage, which includes a wetting jig under which the fibers are passed for applying a resin material to the fibers. The resin material flows through drip openings in the wetting jig and onto the fibers, substantially coating or soaking the fibers with the resin material. The carriage is mounted along a track that extends along the length of the lathe to enable the carriage to be reciprocably movable longitudinally along the length of the lathe. A carriage motor such as a servo motor or similar variable speed reversible motor is mounted at one end of the track to control the movement of the carriage therealong and is linked to a computer control which can be programmed to vary the speed and movement of the carriage along the track, as well as to cause the cariage to pause randoml y dur ing its travel along the length of the lathe.

The lathe further includes a main rotary drive motor mounted at the head-stock end of the lathe. The main drive motor typically is a variable speed reversible electric motor, such as a servo motor, and is inked to the same computer control for the carriage motor, which controls the motor so as to operate the drive motor at varying speeds. A mandrel is received within the collection trough, connected to the drive shaft of the drive motor and is rotated by the main rotary drive motor. The mandrel generally is approximately 12 to 20 feet in length and approximately 14 to 65 inches in width, although mandrels of other, varying sizes also can be used as desired. The mandrel generally includes an outer skin or side wall and first and second ends, mounted to the drive shaft and an idler shaft of the lathe, respectively. Heating elements such as heating tapes are generally mounted within the mandrel for internally heating the skin of the mandrel during curing of the resin material. A release agent such as a plastic film, including a nylon or polyethylene film or a non-stick coating such as a water or oil-based spray solvent-based silanes, and organic waxes, or similar agent is applied to the skin of the mandrel, covering the skin and the first and second ends of the mandrel to prevent the resin material from adhering to the mandrel as the carbon fibers are wound thereabout.

As the mandrel is rotated by the lathe, the carbon fibers, with the resin material applied thereto, are wound about the mandrel as the carriage is moved longitudinally along the track in a reciprocal movement to form a weave or sample about the mandrel. Generally, in most conventional processes for forming carbon fiber composites, the speed of the carriage and rotation of the mandrel is rigidly controlled to form the weave or sample with a very precise, exact pattern. In the present invention, however, as the carbon fiber weave or sample is formed, the speed and movement of the carniage is intentionally randomly varied, including pausing or varying the movement of the carriage along the lathe assembly. In addition, other elements of "chaos" such as varying the number of and size of the fibers, varying the amount of resin material applied to the fibers, adding hard and soft pieces or loose fibers onto the mandrel, modifying the outer skin of the mandrel to change to topography of the weave, varying the speed, pitch and tension of the winding of the fibers about the mandrel, and other actions are introduced so as to break up or physically disrupt any pattern to the weave. These physical disruptions or variations during the formation of the weave provide the resultant composite material with a random, or non-uniform, highly unique cross section and a decorative appearance upon finishing.

After a sufficient desired quantity or thickness of the weave has been wound, the mandrel is removed from the lathe assembly and placed within a vacuum chamber. In one preferred embodiment, the vacuum chamber includes an elongated tube, typically formed from steel and having an inner chamber having a sliding tray that is movable along skids or rollers into and out of the vacuum chamber. An upper mold plate is positioned over the tray and is movable toward and away from the tray, into and out of pressurized engagement with the weave or sample, while the tray finctions as a lower or bottom mold plate. Thus, as the upper mold plate is moved downwardly, the weave is compressed between the two mold plates. An air bladder or other compression device is mounted within the vacuum chamber and is positioned above and mounted to the upper mold plate. The bladder generally is an inflatable air bladder made from a durable, high strength reinforced silicone rubber material, such as AMS 3320G, manufactured by GE. Upon inflation of the bladder, the upper mold plate is urged downwardly into engagement with the sample so as to apply substantially even pressure along the length of the sample within the tray.

The sample is initially vacuumed to remove any air, voids and resin mixture VOCS, are bubbles or pockets, and is monitored to detect a rise in temperature generally of up to 100° F.–120° F. or as needed depending on resin type, time to cure and various other factors, indicating the resin is starting to cure. Thereafter, the bladder is inflated to apply pressure of approximately 5 to 65 psi to the sample while the vacuum is continued. At the same time, the sample is heated to approximately 200°–220° F. for approximately two hours and until the resin material has cured. The temperature and amount of pressure can further be varied depending on the type of resin used. The application of the vacuum and pressure from the bladder causes the fibers to shift and move, further enhancing the effects of the physical disruptions to the pattern of the sample to cause the sample to be formed with a non-uniform cross-section and topography.

After the carbon fiber weave or sample has been compressed and cured, leaving a substantially solid composite material, the sample is removed from the vacuum chamber, cooled and thereafter is cut off of the mandrel to form elongated planks or sheets of carbon fiber composite. The planks or sheets of carbon fiber composite then are put through a finishing process including planing the composite sheets, cutting the sheets into sections and then sanding and assembling the sections into a variety of products.

In an additional embodiment of the system and method of the present invention, a layout tray is used in place of the mandrel and lathe assembly whereby the carbons fibers are woven in layers and placed or laid within the layout tray as the resin-material is applied thereto. The layout tray is generally a rectangularly shaped tray of between 10 to 20 feet in length, similar to the lengths of the mandrel, and includes first and second end walls and parallel sides that define a basin or layout bin for receiving the carbon fibers. As discussed above, variations or physical disruptions are applied during the formation of the weave withi the layout tray. Once the weave has been completed, the tray is placed into the vacuum chamber for vacuuming and compressing to cure the sample.

In a further additional embodiment of the process of vacuuming the carbon fiber weave or sample, primarily for use with the mandrel, once the carbon fiber weave has been wound about the mandrel, the mandrel thereafter is placed within a vacuum bag. The vacuum bag tyically is formed from a plastic bag material such as nylon or polyethylene, such as WRIGHTLON® or IPPLON® nylon bagging films manufactured by Airtech International, Inc., and its ends are sealed with vacuum tape and clamps to render the bag airtight. A vacuum nozzle is received within the clamps at the primary end of the bagged mandrel and the mandrel, within its sealed vacuum bag is then placed within the vacuum chamber (FIG. 5B), and a vacuum is drawn both on the chamber and on the bag. By drawing the vacuum on the bag and the chamber, the bag is caused to float above the carbon fiber weave or sample so that as air is drawn from within the weave, the bag is kept off the weave. Typically, a vacuum is pulled on both the chamber and the bag for approximately 20 minutes to one and one-half hours, depending on the length of the cure life of the resin material applied to the weave, and the system monitored to detect a rise in temperature of the weave that would indicate the start of curing of the resin material.

Once the sample has been sufficiently vacuumed and is beginning to cure, the vacuum in the chamber is reduced so that there is a pressure differential between the chamber and the bag, causing the bag to compress tightly about the carbon fiber weave so as to apply pressure thereto. At the same time, the heating elements within the mandrel are actuated so that the carbon fiber weave is heated as pressure is applied thereto. Typically, a pressure of between 15 psi to approximately 65 psi will be applied to the weave for approximately two hours at approximately 200° F. to cure the sample, although lessor or greater pressures within a range of 1–300 psi and temperatures of 165°–250° F. also can be used. The system is continuously monitored to detect the completion of the curing process. After curing, the composite material is removed from the vacuum chamber, cut off the mandrel and thereafter finished as discussed above.

Various objects, features and advantages of the present invention will become apparent to those skilled in the art upon reading the following detailed description, when taken in conjunction with the accompanying drawings.

DETAILED DESCRIPTION

Referring now in greater detail to the drawings in which like numerals indicate like parts throughout the several views, the present invention comprises a system and method for forming carbon fiber composite material which has a random, nonuniform, decorative and unique appearance in cross section. The resultant products formed from this nonuniform carbon fiber composite material are thus provided with a highly decorative and unique appearance and can be used to form a variety of products including everything from table tops, furniture and flooring tiles to ums, speaker cabinets, and cigar humidors.

Figure 1:
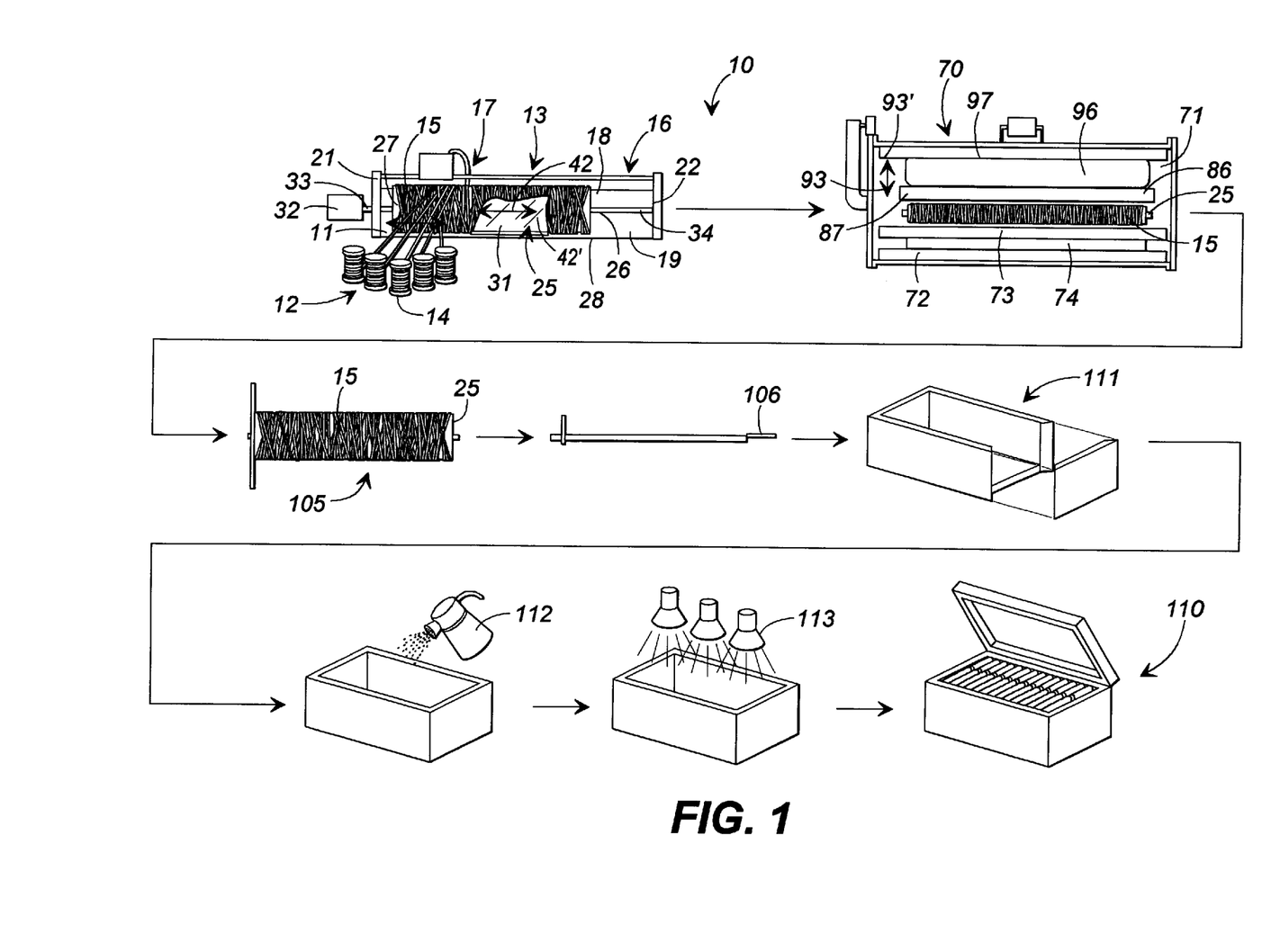
FIG. 1 is a schematic illustration of one embodiment of the system and process of the present invention for forming a carbon fiber composite material.

In a first embodiment of the invention you will have a carbon fiber weaving system 10 and method, a series of carbon fibers 11 are fed from a creel 12 to a winding assembly 13. As shown in FIG. 1, the creel includes a series of spools 14 mounted thereon and about which the rolls of carbon fibers 11 are wound and from which the carbon fibers are fed to the winding assembly. The size or tow of the carbon fibers typically is in a range of between approximately 1,000 to 50,000 individual strands of carbon per carbon fiber, and generally between 5 to 20 spools are used to feed carbon fibers of varying sizes to the winding assembly although it will be understood by those skilled in the alt that various other size fibers, of lesser or greater individual strands per fiber than a 1,000 to 50,000 range or additional or lesser spools of fibers can also be used as desired.

Figure 2:
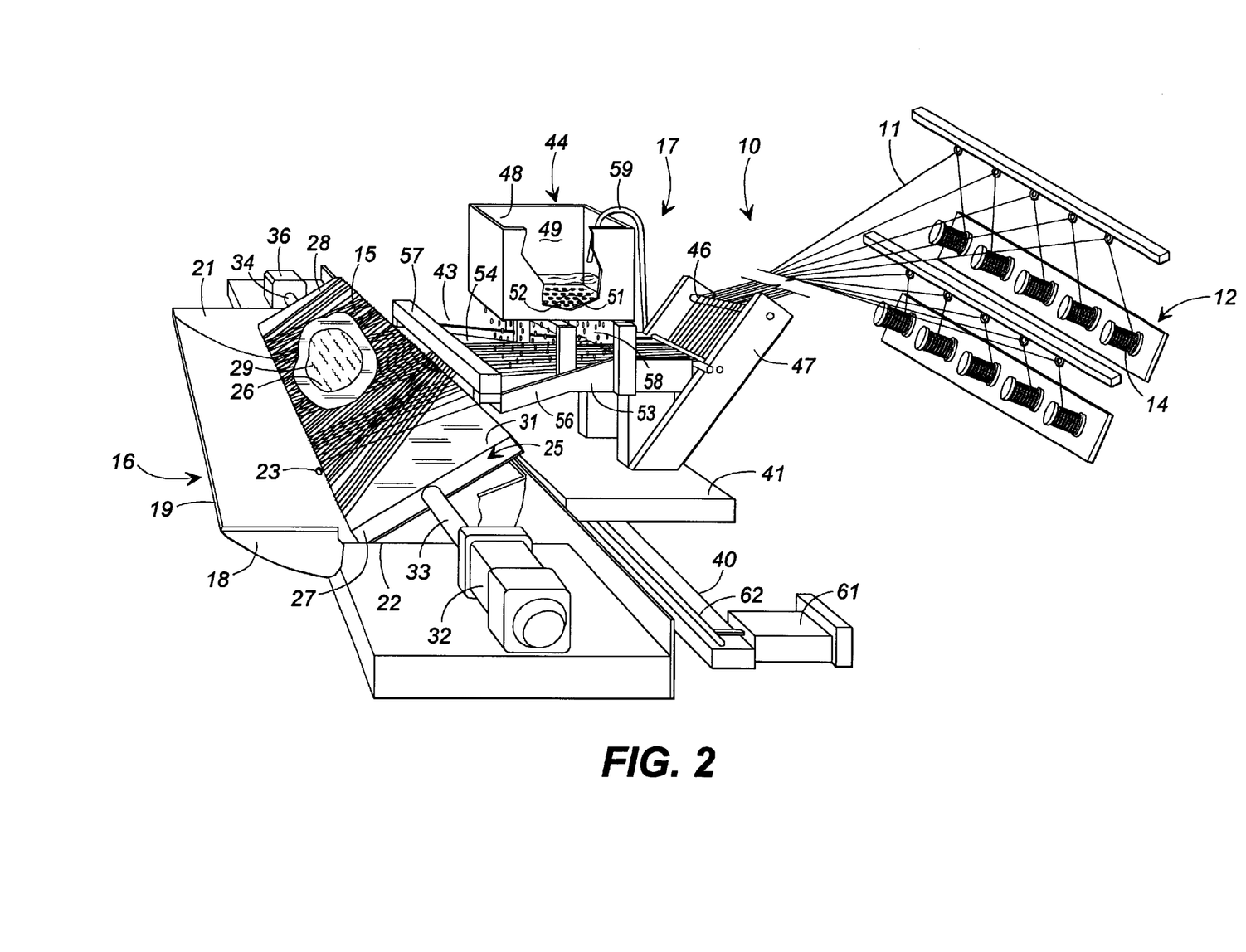
FIG. 2 is a perspective view of the carriage and wetting jig for feeding the carbon fibers to the mandrel of the lathe assembly and applying resin to the fibers.

As illustrated in FIG. 2, the winding assembly 13 includes a lathe 16 and a carriage assembly 17 through which the fibers are fed and wound into a woven carbon fiber sample or weave. The lathe 16 includes a collection trough or basin 18, which is generally a semicylindrical body having a sloped side wall 19 and opposed end walls 21 and 22 at the head stock and tail stock ends, respectively, of the trough, and a drain opening 23 is formed approximately in the center of the trough. A mandrel 25 is positioned and rotated within the trough 18 as illustrated in FIG. 2. The mandrel generally is approximately 12 to 20 feet in length and approximately 14 to 65 inches in width, although mandrels of greater or lesser lengths and greater or lesser widths can also be used as desired. The mandrel includes an outer skin or side wall 26 typically formed from a metal such as alunnim or a similar light weight, corrosion resistant material which covers an internal framework or skeleton (not shown) that provides support for the skin. The mandrel includes first and second ends 27 and 28 positioned at the head stock and tail stock ends, respectively, of the trough and generally is formed with a substantially rectangular shape or configuration. Heating elements such as heating tapes (shown in dashed lines 29 in FIG. 2) are generally mounted within the mandrel for internally heating the skin of the mandrel during curing of the carbon fiber composite material formed on the mandrel.

The mandrel fuirther is covered with a release agent, such as a plastic film including a nylon or polyethylene film such as BLEEDER LEASE® nylon and fiberglass films or WRIGTLON® hydrocarbon release films as manufactured by Airtech International, Inc. or a nonstick coating such as a water or oil based spray such as "SAFELEASE" or "RELEASEALL®" water and solvent based silanes and organic waxes also manufactured by Airtech International, Inc. or similar agents are applied to the skin of the mandrel as indicated at 31 to cover and protect the skin and first and second ends of the mandrel and prevent an epoxy or resin material coated about the carbon fibers from adhering to the mandrel as the carbon fibers are wound thereabout.

As indicated in FIGS. 1 and 2, the lathe 16 further includes a main rotary drive motor 32 mounted adjacent the end wall 21 at the head stock end of the trough. The drive motor typically is a variable speed reversible electric motor, such as a servomotor, stepper motor, hydraulic motor, or similar drive motor than can be run in varying speeds. The drive motor is linked to a computer control (not shown) for the winding assembly which controls the speed of rotation of the drive motor so as to operate the main drive motor at varying speeds. A drive shaft 33 extends from the drive motor and is connected to the first end 27 of the mandrel so as to connect the mandrel to the drive motor in a driving relationship. Similarly, an idler shaft 34 is mounted to and extends from the second end 28 of the mandrel 25 and is attached to a hub or gear box 36 (FIG. 2) mounted at the tail stock end wall 22 for the trough 18 for supporting and enabling rotation of the mandrel by the operation of the drive motor. As the drive motor rotates the mandrel, the carbon fibers are folded and wound about the surface of the mandrel to form the carbon fiber weave or sample 15.

As FIG. 2 illustrates, the carriage assembly 17 is mounted on a track 40 that extends parallel to and along the length of the lathe 16 to enable reciprocal movement of the track along the length of the trough 18. The carriage assembly includes a base or platform 41 that is mounted on and moves along the track 40 in the direction of arrows 42 and 42' (FIG. 1). The base generally is formed from a rigid, strong material such as wood or a metal such as steel, and supports a framework 43 for a wetting jib 44 and tension bars 46 (ig. 2). The tension bars, shown in FIG. 2, are typically formed from metal and are mounted between a pair of angle supports 47 at spaced intervals therealong and help control the fibers passing through the jig and tend to break the fibers to cause the fibers to be substantially thoroughly wet. The carbon fibers are received from the creel 12 and pass over the uppermost tension bar and under the lowermost tension bar which create a drag or tension on the fibers to maintain the fibers in a substantially taut condition as the fibers are fed to the wedding jig and thereafter wound around the mandrel.

The wetting jig generally includes a box or basin 48 typically formed from wood or metal, or similar corrosion resistant material such as a plastic material having side walls 49 defining a containment basin and a bottom wall 51 having a series of drip openings or holes 52 formed therein. A bottom tray 53 is positioned below the basin 48 and includes a bottom surface 54 for which the carbon fibers are moved so as to pass the fibers beneath the drip openings 52 of the basin 48, side walls 56 and a clamp or tension bar 57 at the distal end of the tray so as to maintain tension on the fibers as they are fed to and wound about the mandrel.

A resin material is received within the basin 48 of the wetting jig 44 and is applied to the fibers through the drip openings 52 as indicated at 58. The resin material generally is a synthetic phenolic or polyamide resin such as EPON® resin 828 or a resin 826, manufactured by Shell Chemical Co., Inc., mixed with a low viscosity alphatic amine curing agent such as EPI-CURE® curing agent 9552 also manufactured by Shell Chemical Co., Inc., or a similar epoxy resinous material for bonding the carbon fibers into a composite. It will further be understood by those skilled in the art that acrylic and other types of resin materials also can be used. The resin material flows through the drip openings as indicated at 58 and drips onto and coats the fibers passing over the tray 53 so that as the fibers are fed through the carriage assembly, they are substantially coated or soaked with the resin material. When the resin material initially is loaded into the basin by being poured into the opening top of the basin, and thereafter excess resin that drips off of or is collected from the carbon fibers as they are wound about the mandrel is collected in the collection trough 18 and drains through the drain opening 23 to a recirculating pump (not shown) that recirculates the excess resin material and pumps it back into the basin 48 via a tube or fluid line 59 as shown in FIG. 2.

A carriage motor 61 is mounted at one end of the guide track 40 for the carriage and is connected to the carriage via a drive belt 62. The drive motor typically is a variable speed electrical motor such as a servomotor or a stepper motor or can be other types of variable speed motors including air or hydraulic motors. The carriage motor controls the movement of the carriage along the length of the track and is linked to the same computer control (not shown) that controls the main drive motor 32. The computer control can be programmed to vary the speed and movement of the carriage assembly along the track as well as to cause the carriage to pause randomly during its travel along the length of the track for bearing the winding of the fibers about the mandrel during a winding operation.

As the mandrel 25 is rotated by the lathe 16 the carbon fibers 11 are pulled from their spools through the creel and through the wedding jig of the carriage assembly, as illustrated in FIGS. 1 and 2, and are wound about the mandrel as the carriage is moved longitudinally along the track 40 in a reciprocal movement to fonn the carbon fiber weave or sample 15. Generally, in most conventional processes for forming carbon fiber composites, the winding of the carbon fibers about the mandrel would be rigidly and somewhat precisely controlled to form the weave or sample in a very precise, exact programmed pattern. As a result, the carbon fiber weave typically would be formed with a uniform cross section and appearance. In the present invention, however, as the carbon fiber weave or sample is formed about the mandrel, the speed and movement of the carriage and the speed of rotation of the mandrel are intentionally randomly varied including by pausing the carriage and varying the length of its total movement back and forth along the length of the mandrel so as to specifically break up or disrupt any pattern being formed in the weave.

In addition, the present invention specifically seeks to introduce elements of chaos or physical disruptions in the formation of the carbon fiber weave or sample to break up or physically disrupt any pattern formed in the weave and provide the weave with a substantially nonuniform cross section and appearance. In addition to varying the speed or movement of the carriage along the its guide track, additional disruptive actions or elements of chaos that are introduced by the present invention include varying the number and size of the fibers being wound about the mandrel varying the amount of resin applied to the fibers, varying the viscosity of the resin applied to the fibers, adding pieces or fibers of carbon or pieces of other fibrous material such as fiberglass onto the mandrel as the carbon fibers are wound thereabout, modifying the outer skin of the mandrel to change the topography of the weave being formed about the mandrel, varying the speed and pitch of the winding of the fibers about the mandrel, varying the tension of the fibers as they are applied to the mandrel, varying the tightness of the weave, wrapping the weave with an air permeable material to contain and/or prevent spreading of the fibers, varying the amount of the resin material applied to the fibers to cause the fibers to relax more or less as desired, and wrapping or combining the fibers together in groups and varying the spacing of the fibers as they are wound. Introducing these disruptions or elements of chaos breaks up any pattern that is being formed in the weave during its formation so that the resulting composite has a nonuniform cross section or grain instead of the uniform cross section or alignment of the fibers generally desired for conventional composite forming processes. These physical disruptions or variations or elements of "chaos" introduced during the formation of the carbon fiber weave are intentionally added in the system and method of the present invention in order to provide the resulting composite material with a random, nonuniform, highly unique cross section and thus a highly unique and decorative appearance upon finishing.

As indicated in FIG. 2, after a sufficient desired quantity of carbon fibers has been wound so as to create a weave or sample of a desired thickness about the mandrel, the mandrel 25 is removed from the lathe 16 of the winding assembly 13 and is placed within a vacuum chamber 70 for removing air bubbles or pockets within the sample and thereafter curing the sample to form the completed composite material. As FIG. 1 illustrates, the vacuum chamber 70 generally is an elongated tube, typically formed from steel or similar high strength metal material and can be formed as a cylinder or rectangle, as desired and as conventionally known. The vacuum chamber includes an inner chamber 71 in which the sample is received. A bottom plate 72 (FIGS. 1 and 3A), is fixedly mounted within the inner chamber, generally being formed from a metal such as steel, and supports a sliding tray 73 positioned thereover and which is movable along skids or rollers 74 (FIG. 3) so as to be movable into and out of the inner chamber.

Figure 3A:
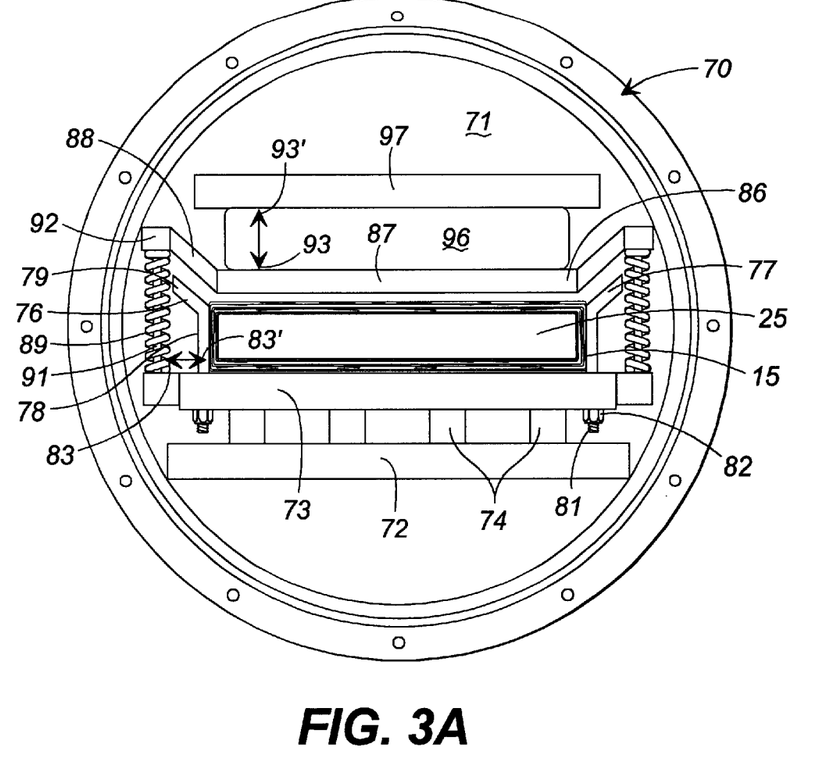
FIG. 3A is an end view of the vacuum chamber of the system of FIG. 1.
Figure 3B:
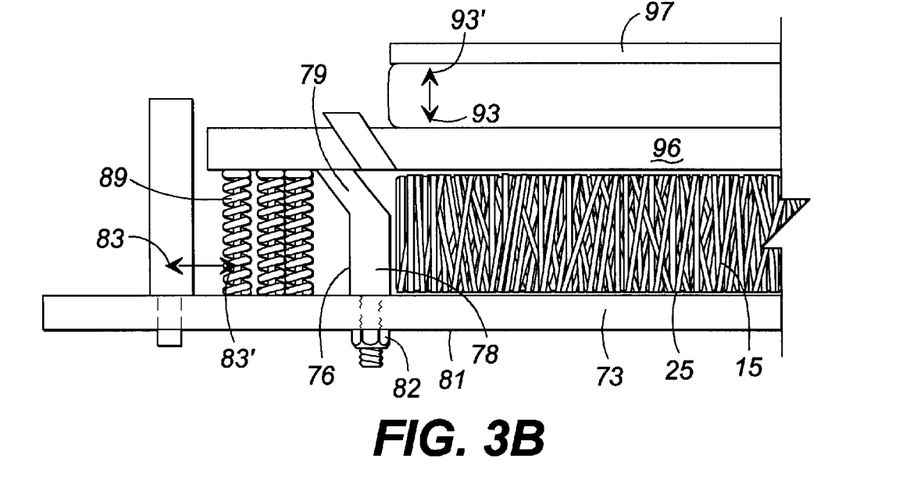
FIG. 3B is an end view of a partial section of the vacuum chamber showing the positioning of compression springs and a movable dam plate for maintaining the upper mold plate out of engagement with the sample prior to the application of pressure thereto.

The tray generally is an elongated, substantially flat member or plate on which the mandrel with the carbon fiber weave formed thereabout is received and supported, and includes movable dam walls 76 and 77 that are positioned along and extend along the sides of the tray so as to form tray side walls for containing the weave therein as pressure is applied. End walls (not shown) likewise are positionable at the ends of the tray so that a substantially rectangular containment basis is formed on the tray to prevent the fibers or resin of the weave spreading outwardly during vacuuming and compression of the weave. As shown in FIG. 3A, the dam walls 76 and 77 include a lower, vertically extending portion 78 and outwardly angled upper sections 79. The dam walls typically are formed from a metal such as steel and receive bolts or similar fasteners 81 within their vertically extending portions 78. The bolts or fasteners 81 further extend through the sliding tray and are secured with nuts such as 82 in a tight frictional engagement with the bottom of the sliding tray. The dam walls are movable laterally in the direction of arrows 83 and 83' to laterally adjust the position of the dam walls to accommodate samples of varying sizes. Once properly positioned, the dam walls are secured in place via the fasteners 81 and together with the end walls (not shown) similarly fashioned to the tray, defined a holding basin or bin in which the carbon fiber weave or sample is contained for vacuuming and compression.

An upper mold plate 86 (FIGS. 1, 3A, 3B) is positioned over the tray and is movable into and out of pressurized engagement with the weave or sample contained within the tray. The upper mold plate 86 includes a substantially flat base or center surface 87 and angled side walls or portions 88 having a similar configuration to the dam walls 76 and 77 (FIG. 3A) of the sliding tray, with the sliding tray fuictioning as a lower or bottom mold plate opposed to the upper mold plate. Compression springs 89 are provided along the sides of the sliding tray, spaced from the dam plates and include guide pins 91 that extend through upperly from the sliding tray through the compression springs and through collars 92 attached to the angled side portions 88 of the upper mold plate. The compression springs support and maintain the upper mold plate out of engagement with the sliding tray and the sample or weave contained therein until a pressure is applied to the upper mold plate so as to cause the upper mold plate to move in the direction of arrow 93 downwardly into pressurized engagement with the sample.

An air bladder 96 is mounted within the inner chamber 71 of the vacuum chamber 70, positioned above and attached to the upper mold plate 86. The air bladder generally is an inflatable air bladder made from a durable, high strength, reinforced silicone rubber material, such as GE AMS 3320G manufactured by General Electric, that is mounted to an upper support plate 97 and is connected to an air line that extends into the vacuum chamber which is connected to an air supply for providing a flow of air to inflate and deflate the bladder as desired. The bladder generally is of approximately the same length and width as the upper mold plate so as to apply substantially uniform pressure force to the upper mold plate to urge the mold plate against the sample contained within the sliding tray in a substantially uniform manner to fully compress and apply substantially even pressure along the entire length of the sample within the tray. Upon inflation of the bladder, the upper mold plate is urged downwardly into engagement with the sample so as to apply substantially even pressure along the length of the sample. It will also be understood by those skilled in the art that other pressure applying mechanisms such as air cylinders, hydraulic pistons, screw jacks, and other similar devices can also be used for moving the upper mold plate into engagement with the sample in place of the inflatable air bladder.

After the sample has been placed within the vacuum chamber, the sample is initially vacuumed to remove any air pockets or bubbles from within the sample, typically being vacuumed between approximately 10 minutes to approximately 80–90 minutes, depending on the cure life of the resin material. During vacuuming of the sample, the bladder 96 is maintained under a vacuum so that it does not inflate and pressurize the sample. The sample is monitored to detect a rise in temperature of up to approximately 1000° F.–120° F., which indicates that the resin is starting to cure although greater or lesser temperatures will be required depending on the resin material used. Once the resin starts to cure, the bladder is then inflated so as to apply pressure along the length of the sample while the vacuum is continued. At the same time, the sample is heated such as via the heating tapes that are internally mounted within the mandrel in order to cause the resin material to cure and solidify. Typically, a pressure within a range of approximately 5 to 65 psi will be applied by the inflated bladder, although greater or lesser pressures in a range of approximately 1 psi up to 500 psi also can be used, and the sample is heated to approximately 160° to 350° F., typically 200–220° F., for approximately 2 hours until the resin material has cured. The temperature and amount of pressure applied further can be varied depending on the type of resin used, the pressure application system, time to cure, amount of time of vacuumring of the sample, thickness, etc.

The application of the vacuum and pressure from the bladder causes the fibers to shift and move, frier enhancing the effects of the physical disruptions and additions of elements of "chaos" to the pattern of the sample, causing the sample to further shift and be formed with a varying topography and nonuniform cross section. The upper mold plate and the sliding tray also can be formed with varying topographies so as to vary the topography and arrangement of the layers within the sample as pressure is applied. In addition, by maintaining the vacuum in the inner chamber as pressure is applied, air is kept from being introduced back into the liquid mass of the sample as pressure and heat are applied for curing the sample.

In addition, it will be understood by those skilled in the art that it is also possible to only partially cure the sample within the vacuum chamber. As a result, the composite material will still maintain some malleability such that it can be removed from the vacuum chamber and placed in a mold and then pressure formed into a desired shape, such as for forming a door, automobile dash board or other desired shape.

After the carbon fiber weave or sample has been compressed and fully cured, leaving a substantially solid composite material, a sample is removed from the vacuum chamber and allowed to cool. Once cooled, the sample is then cut off the mandrel by using a grinder and saw as appropriate. Typically, a layer of a foam material, such as a Styrofoam, or a layer of particle backing approximately ¼ to ½ inch will have been applied along the sides or edges of the mandrel and beneath the release film so as to provide a surface to cut into for cutting the completed composite material off of the mandrel. As illustrated in FIG. 1, cuts generally are made longitudinally along the longitudinal side edges of the mandrel, cutting from the bottom up (flat aside). A grinder typically is then used to grind away areas where the resin has seeped under the aluminum skin of the mandrel so as to free the composite material from the mandrel.

The composite material sheets are fiirther segmented and cut preferably with a diamond blade saw, although other types of cutting tools also can be used. The four resultant panels are inspected for peaks and valleys that won't process through a planer, with the higher peaks being ground down to a median height using a grinder or sander. The resultant planable boards or panels are next passed to a planing station 105 in which the boards are planed or cut using a plane or blade 106 to remove the uneven peaks or valleys or rough surfaces. Typically, to prevent warping, approximately ⅓ of the total amount planed from the panel is removed from the bottom side of the panel while the remaining approximately ⅔ is removed from the top. For example, if the panel is roughly 1 inch thick then the finished thickness will be approximately ½ inch or slightly greater, with approximately 0.165 inch planed from the bottom and 0.335 planed from the top.

After the boards are planed, the panels can be cut into sections or pieces. Thereafter, the sanded and cut sections can be assembled into a variety of products such as, for example, as shown in FIG. 1, a cigar humidor, or can be used to form other products including cremation urns, floor tiles, speaker cabinets, urns, furuture, or other desired products, by mitering and attaching the pieces as by using an adhesive or fasteners such as screws, rivets, or similar fasteners to form the desired product. As indicated in FIG. 1, to form products such as a cigar humidor 110, the planed planks are cut into pieces with the edges of the sections or pieces being mitered to form a joinable edge, which edges are fit up and glued or otherwise attached as indicated in FIG. 1 to form a box. After the completed walled box units 111 are completed and the adhesive material dried and set up, the box units are sanded to remove any pitting or minor imperfections, and thereafter are painted or coated with a clear coat material or paint as indicated at 112. Multiple coats of clear coating or painting are typically applied as necessary to provide the composite material with a smooth, uniform appearance. The coated or painted products then are allowed to cure under heat lamps such as 113 to dty and seal the clear coating. Thereafter, the box lid and additional materials such as the inner lining, etc. for the humidor are applied to form the finished humidor 110. It will be understood by those skilled in the art that once the composite material has been removed from the mandrel, cut, planed, and sanded, various additional processing operations can be carried out on the composite material to form a variety of desired products.

Figure 4:
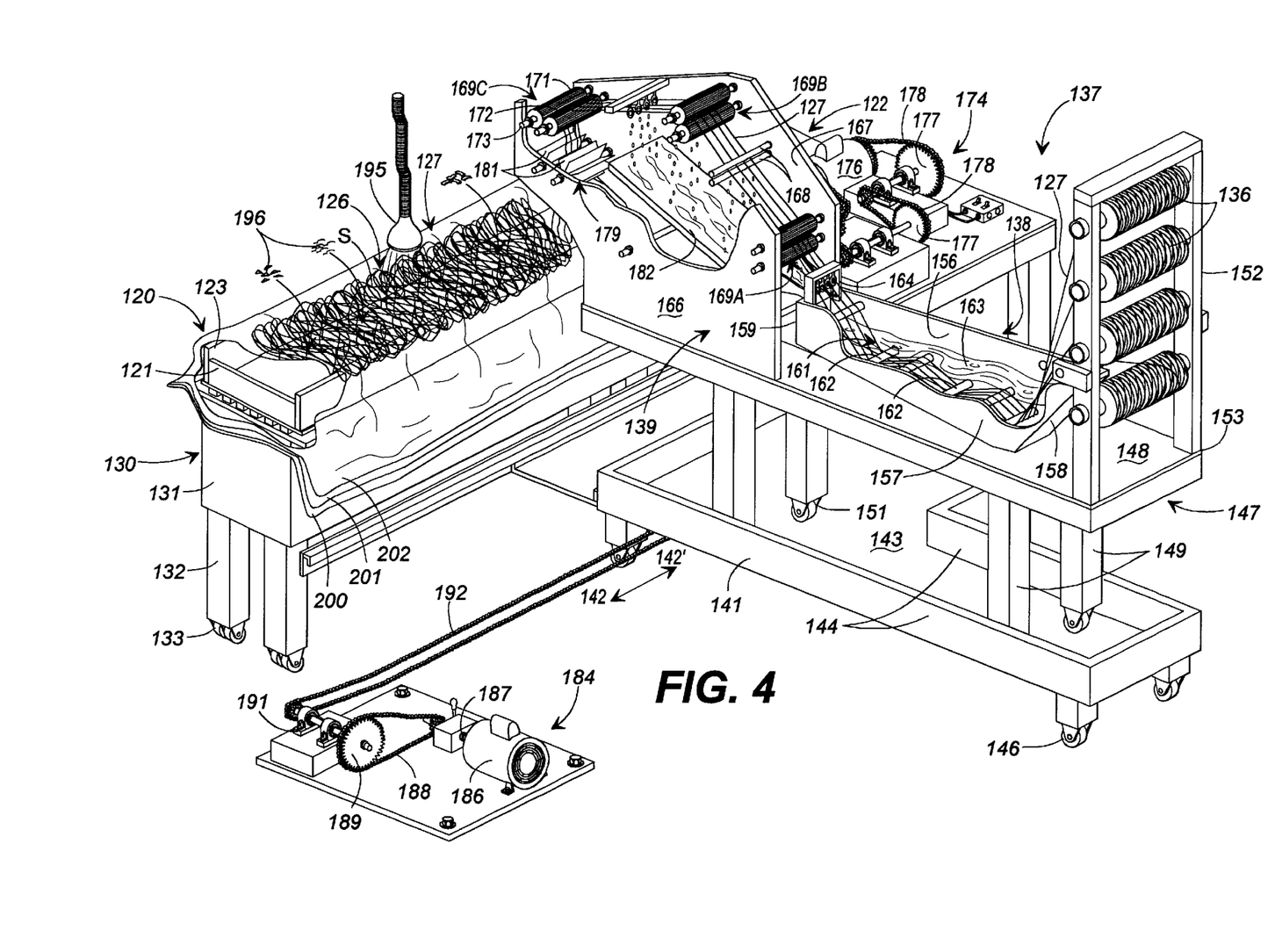
FIG. 4 is a perspective view of an additional embodiment of the present invention showing a woven mat of fibers being formed and laid in a layout tray.

An additional embodiment of the system and method of the present invention is illustrated in FIG. 4 wherein a layout tray 120 is used in place of the mandrel and lathe of the winding assembly shown in FIGS. 1–2. As indicated in FIG. 4, the layout tray 120 generally is made from wood, metal or a similar high strength, durable material and is a substantially rectangularly shaped tray approximately 10 to 20 feet in length and 2 to 6 feet in width, similar to the lengths and widths of the mandrel as illustrated in FIGS. 1–2. The tray includes first and second end walls 121 and 122 and parallel side walls 123 and 124 that define a basin or bin 126 for receiving layers of woven cazbon fibers 127 to form a weave or sample "S". Typically, the side walls of the tray are solid, fixed in place walls, although the side walls of the layout tray also can be formed as removable partitions with angled or pointed lower ends that fit into a notch formed in the layout tray and secured within the notches by bolts or similar fasteners. The tray 120 is mounted on a movable platform 130 which includes a body portion 131 mounted on a series of legs 132. Rollers or wheels 133 are mounted to the legs for ease of movement of the platform 130 for transport of the tray 120 to the vacuum chamber for vacuuming and pressing of the sample S, as discussed in greater detail below.

As shown in FIG. 4, the fibers 127 fed to the tray 120 from spools 136 through a fiber distribution system 137. The fiber distribution system 137 generally includes a wetting trough or jig 138 and a fiber delivery mechanism 139 through which the fibers are wet or soaked with resin and are pulled and broken or separated for delivery into the tray 120. As FIG. 4 illustrates, the fiber distribution system further includes a movable carriage 141 that supports the fiber distribution system and is movable in the direction of ariows 142 and 142' along the length of the layout tray 120. The carriage generally is a substantially rectangular or L-shaped platform having a base 143 bordered by a series of vertically extending side walls 144. A series of rollers 146 are mounted beneath the base 143 for supporting and enabling the carriage 141 to move in the direction of arrows 142 and 142' as well as toward and away from the layout tray as desired.

A movable platform 147 is received on the base 143 of the carriage 141 and includes a substantially flat upper table portion 148 mounted on a series of legs 149 having rollers 151 attached thereto so as to enable the platform 147 to move toward and away from the layout tray for altering the delivery of the fibers to the layout tray. An upstanding creel or rack 152 is mounted along a rear end 153 of the platform 147 and generally supports a series of four to six spools 136 of fibers 127. These spools are rotatably mounted on the rack and feed the fibers in elongated strands to the wetting trough 138 and fiber delivery mechanism 139.

The wetting trough 138 generally is substantially rectangularly shaped and has a series of vertically extending side walls 156 and 157 and end walls 158 and 159 that define an open ended basin 161. A series of breaker bars 162, typically formed from aluminum, plastic or similar noncorrosive material, are mounted at varying intervals within the basin 161 with the fibers being interwoven about the breaker bars as shown in FIG. 4. A supply of resin, indicated at 163, is received within the basin of the wetting trough so that as the fibers pass over and around the breaker bars, the fibers tend to ribbon out and are spread and are thoroughly soaked or wet with resin. A feed guide 164 is mounted on the top of end wall 159 and generally includes a series of eyes or guide tubes through which the individual fibers are separated and passed to the delivery mechanism 139.

As shown in FIG. 4, the delivery mechanism 139 generally includes a pair of parallel, upstanding side walls 166 and 167 that define an open ended passage therebetween for the fibers. A series of breaker bars 168 are positioned at varying intervals between the side walls 166 and 167 for guiding the fibers about a substantially serpentine path through the delivery mechanism 139. Pairs of power rollers 169A–169C are mounted between the side walls as shown in FIG. 4 and each includes apair of toothed rollers 171 having a series of radially extending teeth 172, with the teeth of each pair of rollers meshing engagement and the rollers being mounted on drive shafts 173. The fibers are received between the intermeshing teeth of the pairs power rollers so that the fibers are pulled between the rollers and through the fiber delivery mechanism as the rollers are rotated.

A roller drive 174 is positioned on the platform 147 adjacent the fiber delivery mechanism 139 and includes a drive motor 176 that drives a series of gears 177 and belts or drive chains 178 which are conmected to and drive the pairs of power rollers 169A–169C for pulling the wetted fibers through the wetting trough 138 and delivery mechanism 139. A pair of paddle rollers 179 are mounted below the last pair of power rollers 169C as shown in FIG. 4. The paddle rollers generally are oriented horizontally below the last pair 169C of power rollers and are driven by the roller drive 174. The paddle rollers each include a series of radially projecting fins or paddles 181 that are substantially larger than the teeth of the rollers of each pair of power rollers. The fins of the paddle rollers engage the fibers therebetween so as to further break up and cause the fibers to be ribboned out as they are distributed into the basin of the layout tray 120. In addition, a collection pan 182 is positioned between the side walls 166 and 167 of the fiber delivery mechanism 139, extending downwardly at an angle toward the wetting trough 138. As resin 163 drips or falls from the resin soaked fibers, it is received on the collection pan 182 and is directed back to the wetting trough for recycling of the excess resin to reduce waste.

As further illustrated in FIG. 4, the movable carriage 141 for the fiber distribution system 137 is moved along the length of the layout tray about a longitudinal path in the direction of arrows 142 and 142' by a carniage drive 184. The carriage drive 184 generally includes a variable speed drive motot 186 and a drive shaft 187 that drives a drive belt 188 and in turn a drive gear 189. The drive gear 189 is mounted to a transmission shaft 191 about which a chain or track 192 is mounted so that as the transmission shaft is rotated by the drive motor, the chain 192 is in tum moved in a reciprocable motion in the direction of arrows 142 and 142'. The carriage 141 is attached to the chain or track 192 so as to thus be moved in a reciprocating fashion along the length of the layout tray 120 in the direction of arows 142 and 142'.

As the fiber distribution system is moved back and forth along the length of the layout tray, fibers 127 that have been thoroughly soaked with resin are deposited in the basin of the layout tray in layers so as to create the sample S of a desired thickness. As the fibers are being laid out in the tray, additional resin can be applied as indicated at 195 via a sprayer or simply by pouring the resin over the fibers. As discussed above, as the fibers are laid out in the tray, variations or physical disruptions are made to the laying out of the fibers such as varying the thickness of the fibers along the tray, varying the size and amounts of fibers, varying the viscosity and amount of resin applied to the fibers, altering the topography of the tray and other physical disruptions as discussed above. In addition, pieces of carbon fibers or various other types of fibers such as fiberglass, metal threads such as gold and other materials can be added as indicated at 196 to change the topography and farther disrupt any pattern of the fibers for providing the sample with a substantially nonuniform cross section and to enhance the unique decorative appearance of the resultant composite upon finishing.

Figure 5A:
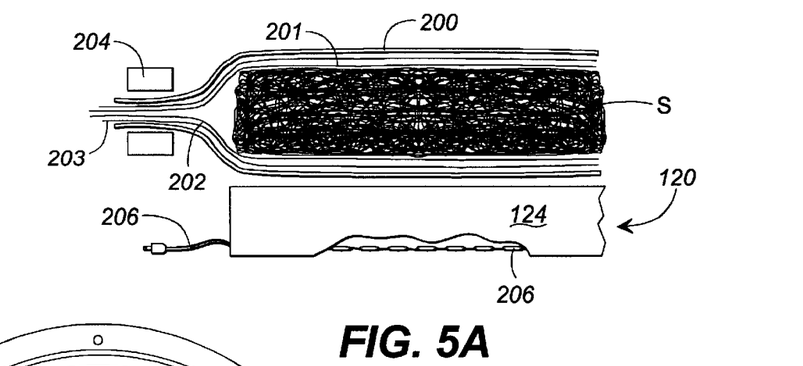
FIG. 5A is a partial side view of the composite sample at one end of the layout tray of the embodiment of FIG. 4.

As illustrated in FIGS. 4 and 5A, prior to depositing the resin soaked fibers in the layout tray 120, the layout tray is covered with a first layer of a plastic release film 200. The release film is generally a plastic film such as WRIGHT-LON® or BLEEDER LEASE® bagging films manufactured by Airtech International, Inc., and is formed in a sheet approximately 36 inches in width and a length that is slightly greater than the length of the layout tray so as to overlap the sides and ends of the layout tray. A layer of gauze cloth 201 approximately 36 inches wide and a length approximately the same as the release film is applied over the release film to provide strength for the sample. Thereafter a 36 inch wide piece of perforated plastic film 202 is applied over the gauze cloth 201. Once a sample of a desired thickness has been deposited within the basin of the layout tray, the perforated film, gauze cloth and release film layers are thereafter wrapped over the sample, as shown in FIG. 5A, with the ends of the perforated film, gauze cloth and release film being glued or otherwise adhered together to form a wrapped sample approximately fourteen inches wide and approximately twelve feet in length. The resulting sample then is mechanically worked such as by rolling or kneading to further intermix the fibers and disrupt any pattern formed therein and to msure that the fibers and are thoroughly wet and soaked with resin and thus will have a substantially nonuniform cross section and appearance.

As shown in FIG. 5A, thermocouples 203 are inserted into the sample to monitor and provide temperature readings of the sample throughout the vacuuming, pressing and curing cycles. These thermocouples are plugged into mating receptacles within the vacuum tube connected to readouts and temperature control switches (not shown). Thereafter, the ends of the wrapped release film, gauze cloth and perforated film are clamped together by clamp blocks 204 to seal the ends of the wrapped film and gauze cloth to create a sealed sample. Heating elements 206 such as heat tapes or similar wire heaters are further mounted within the layout tray as indicated in FIG. 5A for heating the layout tray and thus the sample therein during the pressing and curing cycle.

Figures 5B, 5C:
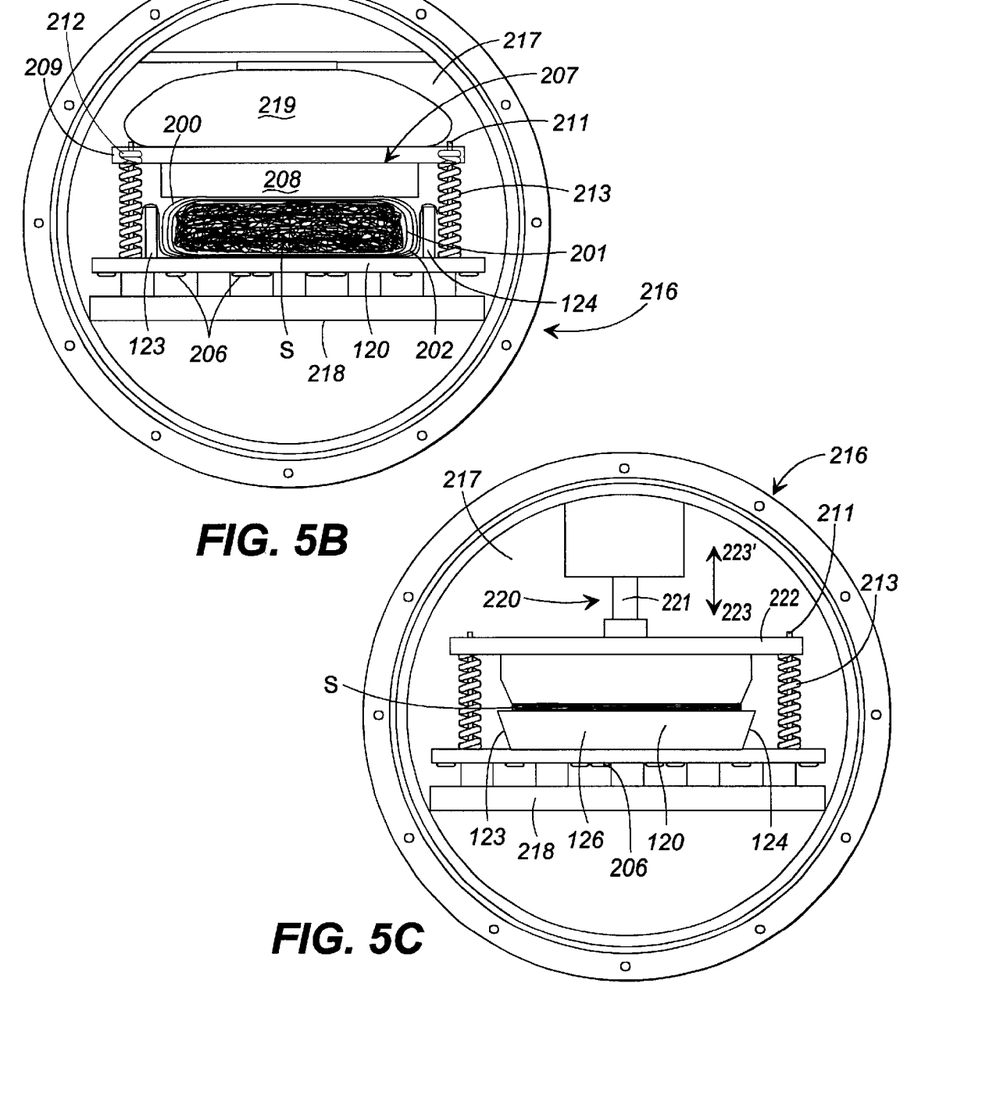
FIG. 5B is an end view of the layout tray withln the composite sample received therein.
FIG. 5C is an end view of an additional embodiment for compressing the composite sample within a layout tray.

After a sufficient thickness of the carbon fiber weave or sample has been achieved, excess fibers are trimmed or cut away and the sample is wrapped in the layers of release film, gauze cloth and perforated film as illustrated in FIGS. 5A and 5B. Thereafter, an upper mold or caul plate 207 is lowered into engagement with the sample S. The mold plate 207 (FIG. 5B) generally is an elongated metal plate having a center mold section 208 and outwardly extending flanges 209 that overlap the ends and sides of the tray. The center section 208 can be formed flat or can be formed with a varying topography for further physically altering the formation of the sample as pressure is applied thereto with the mold plate. Guide pins 211 are mounted to the upper surface of the layout tray adjacent the side walls and end walls thereof and are received through openings shown at dashed lines 212 formed in the flanges 209 of the mold plate 207 for guiding the mold plate downwardly into engagement with the carbon fiber sample or weave. Springs 213 are received about the guide pins 211 and engage the flanges of the mold plate so as to hold the mold plate above the carbon fiber sample or weave to maintain the mold plate in a raised, nonengaging position when pressure is not being applied to the sample. This enables ease of movement of the layout tray into and out of a vacuum chamber 216 without interference from the mold plate.

FIG. 5B shows an embodiment for compression and vacuuming of the sample formed in the layout tray 120 within a vacuum chamber 216. In this embodiment, the vacuum chamber 216 includes an inner chamber 217 having a bottom plate 218 generally formed from a metal such as steel or similar material upon which the layout tray 120 is received and supported. After the tray has been placed within the vacuum chamber, a vacuum is applied to vacuum the sample to approximately 5 hours or less for approximately 20 to 90 minutes. During this time, the temperature of the sample is monitored and initial heating of the sample is begun using the heating tapes of the layout tray. The sample is heated to initially raise its temperature to between approximately 75° to 135° F. prior to the start of the pressing cycle. Also, in this embodiment an air bladder 219 is mounted within the inner chamber. The air bladder initially is held under a vacuum during the vacuuming cycle but is thereafter inflated during the pressing cycle to urge the upper mold plate 207 downwardly against the springs and into engagement with the sample within the tray, with the tray thus acting as a lower mold plate so that the sample or weave is compressed therebetween.

An additional embodiment of a pressure application mechanism, here illustrated as a hydraulic or air cylinder 220 also can be used provided within the vacuum chamber 216 as illustrated in FIG. 5C for applying a pressure or force to the upper mold plate for compressing the sample within the layout tray 120. Typically, multiple cylinders are used in addition to the one cylinder illustrated, with the cylinders being positioned at spaced intervals along the length of the vacuum chamber to ensure even application of a compression force along the upper mold plate and the tray. The cylinder includes a shaft 221 and a pressure plate 222 that is moved into and out of engagement with the upper mold plate 207 in the direction of arrows 223 and 223' to apply pressure to the upper mold plate. The pressure plate generally is formed from a metal such as steel or similar high strength, rigid material and extends substantially along the length of the vacuum chamber so that pressure is applied evenly along the length of the upper mold plate and thus evenly along the length of the sample contained within the layout tray.

The bladder or air cylinder applies a pressure of between 5 to 65 psi to the sample while the vacuum in the vacuum chamber is released slowly to bring the chamber up to atmospheric pressure. Thereafter, the sample is slowly heated under pressure to raise the temperature of the sample to approximately 165°–250° F. to cure the sample. Typically, the curing of the sample occurs over 1–4 hours. The temperature and amount of pressure as well as the time during which such temperature and pressure is applied generally will be varied depending on the type of resin used and the extent to which it is desired that the sample be cured. After the sample has been cured to form the completed composite material, pressure is removed from the sample and the tray is removed from the vacuum chamber after which the sample is extracted from the layout tray. The sample thereafter is cut, planed, sanded and finished to form a desired product as discussed above.

Figure 6A:
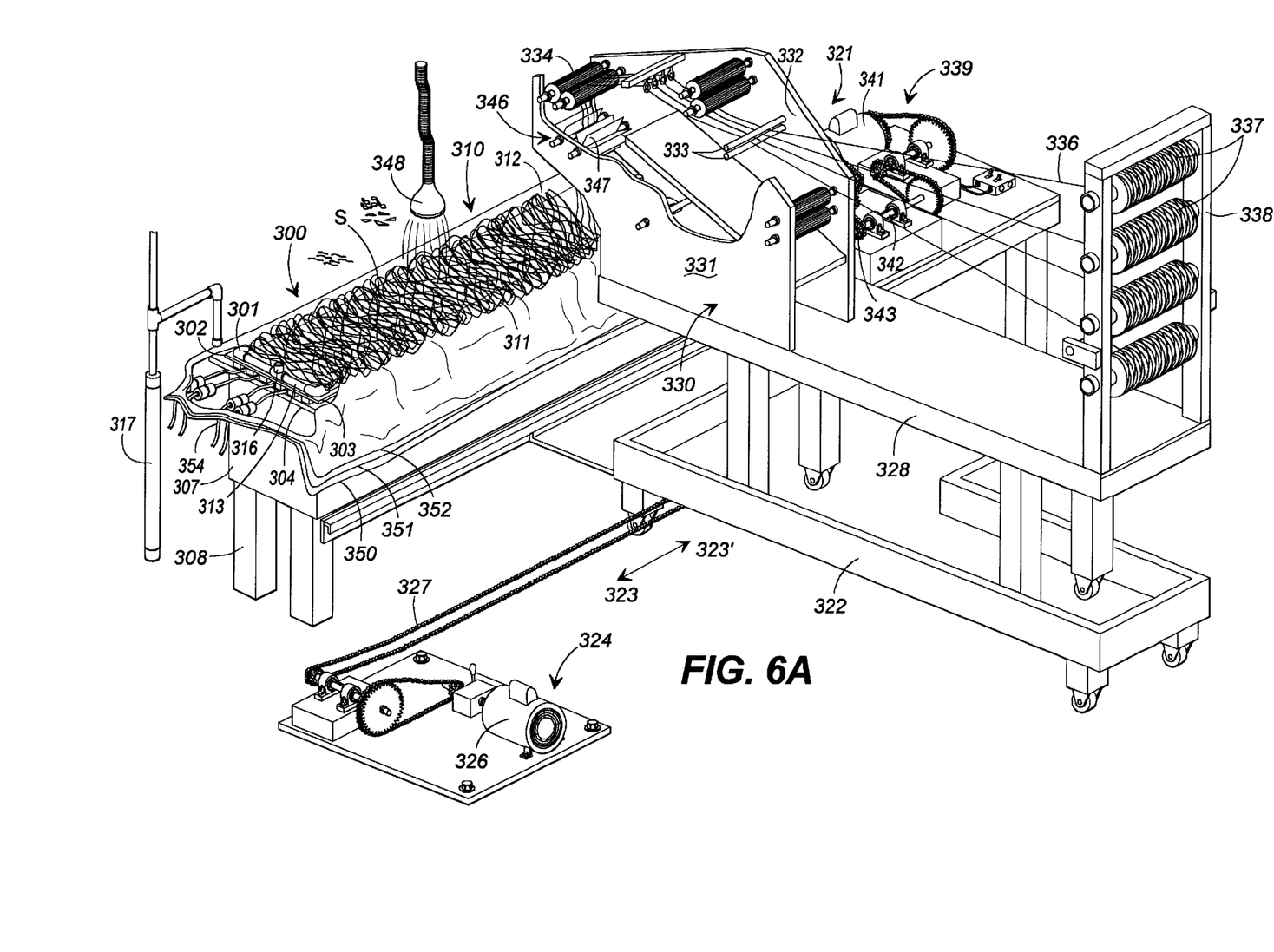
FIG. 6A is a perspective view of an additional embodiment of the present invention for laying out and vacuuming the composite sample in a layout tray.
Figure 6B:
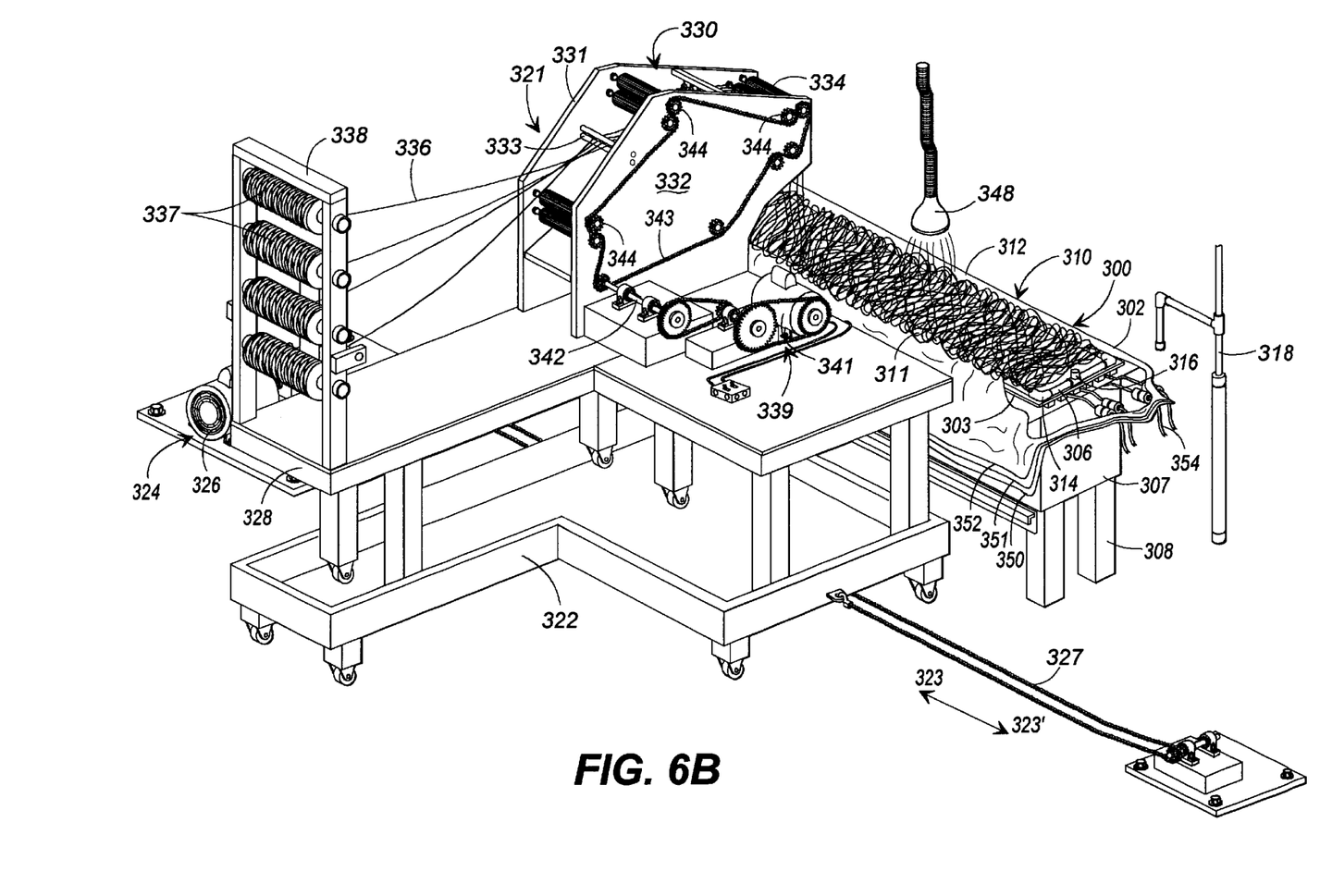
FIG. 6B is a perspective view of the embodiment of FIG. 6A.
Figure 7A:
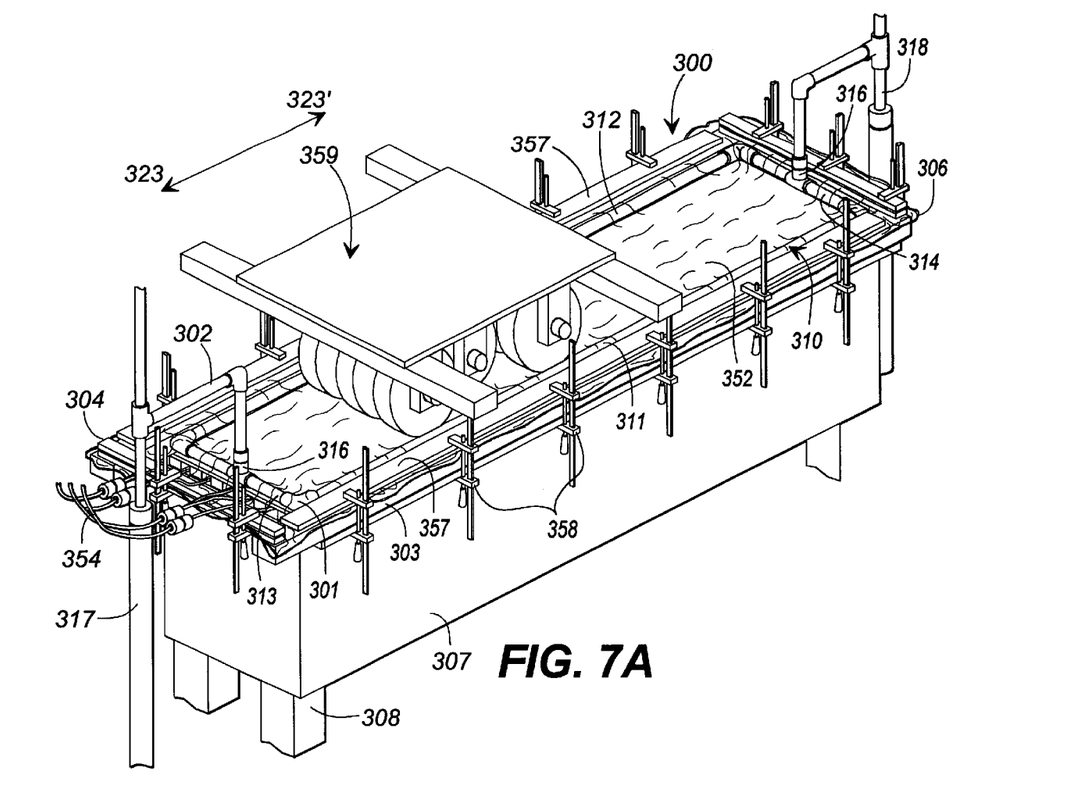
FIG. 7A is a perspective view of the layout tray of the embodiment of FIGS. 6A and 6B.
Figure 7B:
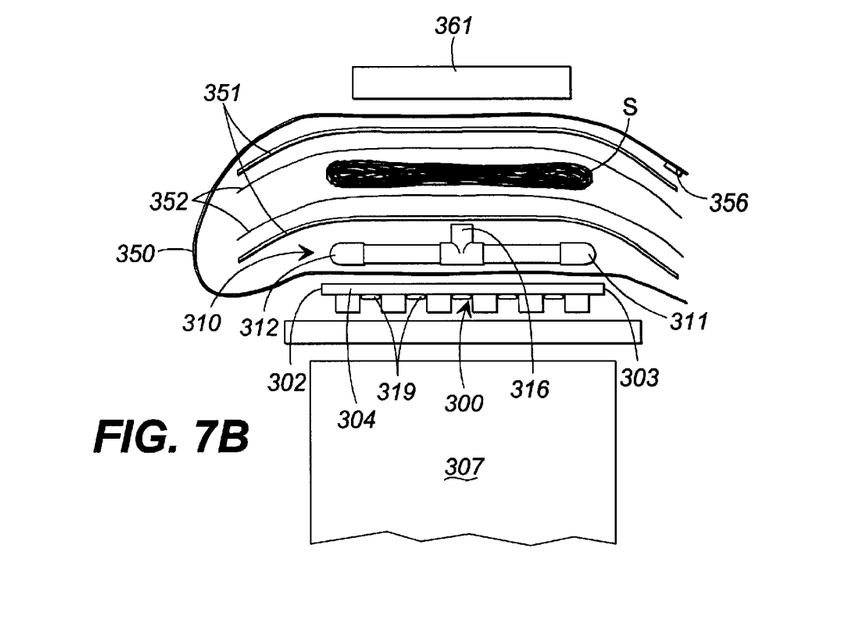
FIG. 7B is an end view showing the composite sample and tray of the embodiment of FIGS. 6A and 6B.

FIGS. 6A–7B illustrate a further embodiment of the present invention, similar to the embodiment of FIG. 4. In this embodiment, a layout tray 300 is provided with a construction slightly different from the layout tray 120 of FIG. 4. The layout tray 300 (FIGS. 6A–7A) generally includes an elongated, substantially flat plate 301 having sides 302 and 303 and ends 304 and 306 (FIG. 6B), and typically is formed from a rigid, substantially durable material such as a metal such as steel, wood or plastic. The plate 301 is supported on a base or platform 307 having legs 308, and typically is approximately 10 to 14 feet in length and approximately 2 to 4 feet in width, similar to the layout tray 120 of the embodiment of FIG. 4. As indicated in FIGS. 6A–7A, the layout tray 300 generally is formed without walls along its sides and ends. Instead, an elongated, rectangular vacuum frame or collar 310 is set in place about the perimeter of the layout tray as indicated in FIG. 7A. The vacuum frame generally is formed from polyvinylchloride (PVC) tubing or similar plastic or durable material, generally having a diameter of between approximately ¾ inch to 1½–2 inches, although various other size PVC tubing also can be used for the vacuum frame. The vacuum frame includes elongated side sections 311 and 312 (FIG. 6A) and end sections 313 and 314. Vacuum ports 316 or inlets are formed in each end piece for connection of the vacuum frame to the vacuum supply conduits indicated generally at 317 and 318 (FIG. 6B). Vacuum openings or holes (not shown) are formed along the inwardly facing sides of the end and side sections of the vacuum frame for drawing a vacuum therethrough. Also, as shown in FIGS. 7B, heating elements 319 such as heating tapes are applied to the underside surface of the tray 300 for heating the tray as needed to heat a carbon fiber weave or sample S formed on the tray.

The embodiment of the present invention illustrated in FIGS. 6A and 6B further uses a similar fiber distribution system 321 to the system 137 of the embodiment of FIG. 4, without use of the wetting trough 138. The fiber distribution system includes a carriage 322 that is movable along the length of the tray 300 in the direction of arrows 323 and 323' by a carriage drive 324 (FIG. 6A) and which includes a drive motor 326 that pulls or moves a drive chain or track 327 in the direction of arrows 323 and 323'. The carriage 322 is mounted to the drive chain or track 327 so as to thus be moved in the direction of arrows 323 and 323' with the movement of the drive chain by the drive motor carriage drive 324. A movable platform 328 is received and supported on the carriage and supports a fiber delivery mechanism 330 similar to the fiber delivery mechanism 139 discussed above with respect to the embodiment of FIG. 4.

As discussed with respect to the embodiment of FIG. 4, the fiber delivery mechanism 330 generally includes a pair of parallel upstanding side walls 331 and 332 that define an open ended passage therebetween. A series of breaker bars 333 are positioned between the side walls 331 and 332 and pairs of power rollers 334 are mounted between the side walls. In this embodiment, while three pair of power rollers are illustrated, generally only one pair of power rollers 334 will be utilized for engaging and pulling a series of fibers 336 from spools 337 arranged on a rack or creel 338 mounted at the rear of the platform 328. The fibers thus are pulled directly from the spools 337 through one set of power rollers positioned at the discharge end of the fiber delivery mechanism as shown in FIG. 6A, without passing through a wetting trough or having resin applied thereto prior to being deposited on the layout tray. Instead, the fibers are delivered to the layout tray dry, with the fibers are being applied in layers as the fiber distribution system is moved back and forth along the layout tray and any pattern in which the fibers are laid out on the tray being varied. In addition, other fibers and materials such as fiberglass or pieces of carbon fibers being applied to vary or disrupt the pattern or cross section of the sample thus formed. The power rollers 334 are generally toothed rollers having a series of intermeshing, radially projecting teeth between which the fibers 336 are engaged and pulled from the spools. A roller drive 339 (FIG. 6B) is mounted on the movable platform adjacent the fiber delivery mechanism 330 and includes a drive motor 341 that drives a trrnsmission shaft 342 and which in turn drives a drive chain or belt 343. The drive chain or belt 343 is encircled about a series of drive gears 344 for each of the pairs of power rollers for gauging the rotation of the power rollers.

A pair of paddle rollers 346 (FIG. 6A) are mounted below the power rollers 334 so as to receive the fibers 336 therefrom. The paddle rollers generally are oriented horizontally and each include a series of radially projecting elongated fins or paddles 347 that are substantially larger than the teeth of the power rollers. The paddle rollers are driven by roller drive 339, so that the fibers are engaged and pulled between the paddle rollers as shown in FIG. 6A. The fins of the paddle rollers engage the fibers therebetween so as to crush and firther break up and cause the fibers to be spread or ribboned out as the fibers are distributed onto the layout tray 300.

The position of the paddle rollers above the layout tray is varied by movement of the carriage and platform so as to flirther disrupt any pattern being formed in the fibers as they are deposited on the layout tray. As the fibers are deposited on the layout tray 300, as illustrated in FIGS. 6A and 6B, the resin material is sprayed or otherwise applied to the fibers to wet the fibers as shown at 348. Typically one to twelve gallons of resin material can be applied to the fibers on the layout tray as needed to wet the fibers to a desired degree or extent. In addition, variations or physical disruptions are made to the laying out of the fibers in the tray, as discussed with respect to the previous embodiments, such as varying the size of the fibers and the thickness of the fibers applied along the tray, varying the viscosity and amount of resin applied and adding other fibers, including carbon fibers, fiberglass, metal threads and other materials, to the sample S being formed on the layout tray to form the carbon fiber weave or sample having a desired series of characteristics to provide the resultant sample composite with a substantially nonuniform cross section and unique decorative appearance upon finisling.

As shown in FIGS. 6A, 6B and 7B, prior to the fibers 336 being applied onto the layout tray 300, the tray is initially covered with a sheet of a release film 350, which typically is a plastic bagging film such as WRIGHTLON®, as manufactured by Airtech International, Inc. Typically, the release film will be formed in a sheet approximately 159 inches by 21 inches, although larger or smaller release film sheets can be used depending on the size of the layout tray and the sample being formed thereon. Typically, the vacuum frame 310 is positioned over the release film, being adhered thereto with a spray adhesive such as a contact cement or similar sealant material. A layer of porous, compressible fabric breather blanket material 351, typically 148 inches by 18 inches, is applied over the PVC frame and a layer of a perforated plastic film 352, typically 14 inches by 144 inches, is applied over the frame and fabric breather blanket material. The fabric breather blanket material provides additional stability and strength for the sample, while enabling air to be drawn through the sample into the vacuum frame by providing channels or passages between the outside of the sample and the vacuum frame. Once a sample of a desired thickness has been formed on the layout tray, thermocouples 354 are inserted into the sample and connections are made to the heating elements for the layout tray. The thermocouples monitor the heating of the sample in the layout tray as the sample is vacuumed, pressed and heated for curing.

As indicated in FIGS. 6B and 7B, once the sample has been formed to a desired thickness, the fibers are cut from the fiber delivery mechanism, which is then moved to a position out of the way from the layout tray. Thereafter, the perforated film 352, blanket 351 and release film 350 generally are wrapped over the sample, or, in the alternative, additional layers of the perforated film, breather blanket and release film are added over the top of the sample, and the edges of the release film, blanket and perforated film are sealed together. Typically, the edges of the release film are sealed together with strips of flexible vacuum tape 356 (FIG. 7B) applied between the edges of the release film, over which elongated clamp plates or collars 357 (FIG. 7A) are applied along the sides and ends of the release film, breather blanket and perforated film as shown in FIG. 7A. The clamp plates or collars 357 are held in place with adjustable clamps 358 placed at spaced intervals about the periphery of the layout tray and which clamp and hold the clamp plates 357 in a substantially air tight engagement with the edges of the release film, breather blanket and perforated film. The release film further is sealed about the vacuum ports or connections 316 at each end section 313 and 314 of the vacuum fame 310 using a sealing caulk or compound such as a silicone sealant material that is applied about the vacuum ports to seal the plastic of the release film around the vacuum ports. With the edges of the release film, blanket and perforated film sandwiched between the clamp plates or sealing collar 357 (FIG. 7A) and clamps 358, an even and constant seal is formed between the release film, blanket and perforated film with the sample S encapsulated therebetween.

With the sample S thus sealed within the layers of the release film, breather blanket and perforated film as shown in FIG. 7A, a vacuum is drawn through the vacuum frame at approximately 1 to 5 torr. After the vacuum has been commenced on the sample, the system is checked for leaks and the sample is mechanically worked such as by kneading, rolling, pounding and/or vibrating the sample. In the example shown in FIG. 7A, a weighted cart 359 is placed on top of the sample, with additional weights being added as needed or desired, and is moved along the length of the layout tray 300 in the direction of arrows 323 and 323' so as to compress and cause the carbon fibers of the sample to be mechanically kneaded and rolled. As a result, the fibers are caused to be flirther intertwined or intermeshed as air is drawn from the sample and through the breather blanket and perforated film into the vacuum frame. In turn, the fibers are caused to become more thoroughly wetted or soaked with resin, and any pattern that may have been formed in the fibers is further altered or disturbed to insure that the sample will have a substantially nonuniform cross section.

The vacuuming of the sample is conducted for approximately 20 to 60 minutes with the temperature of the sample further being increased through the heating elements so as to raise the temperature of the sample to a point where the sample is substantially fluid as the vacuum is increased to approximately 5 torr. Thereafter, an upper mold plate 361 (FIG. 7B) is installed on top of the sample, with the sample S being sandwiched between the upper mold plate and the layout tray. The upper mold plate generally is substantially flat, but also can be formed with a varying topography for further disrupting the formation of the composite sample if so desired. The upper mold plate is clamped down against the sample and layout tray so as to apply a pressure of between 1 to 65 psi evenly along the length of the sample to produce a substantially flat, even, dense composite. The vacuuming of the sample is continued at a level below 5 torr for approximately 1 to 10 minutes after which the vacuum is shut off and the sample is further heated to increase its temperature to a prescribed cure level of upwards of 165° to 250° F., which is applied for 1 to 4 hours to cure the sample, with the temperature and timing of the curing being connected depending upon the resins used, the amount of pressure being applied and the extent of cure desired for the sample.

Once the sample has been cured, the heating elements are turned off and the sample is allowed to cool to room temperature. Thereafter, the clamps and clamp plates are removed and the release film, blanket and perforated film are stripped from the sample and the sample removed from the tray. Thereafter the sample is cut, planed, sanded and otherwise finished by sanding, painting and polishing as discussed above.

Figure 8A:
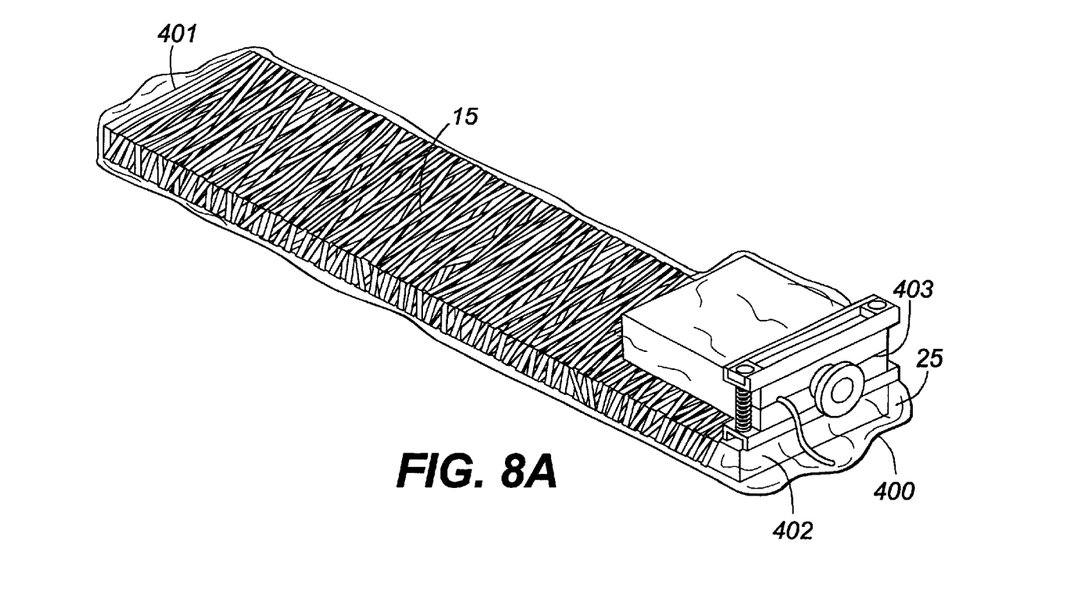
FIG. 8A is a perspective view illustrating an additional embodiment of the system and method of the present invention for vacuuming and applying pressure to the sample by placing the sample within a vacuum bag.
Figure 8B:
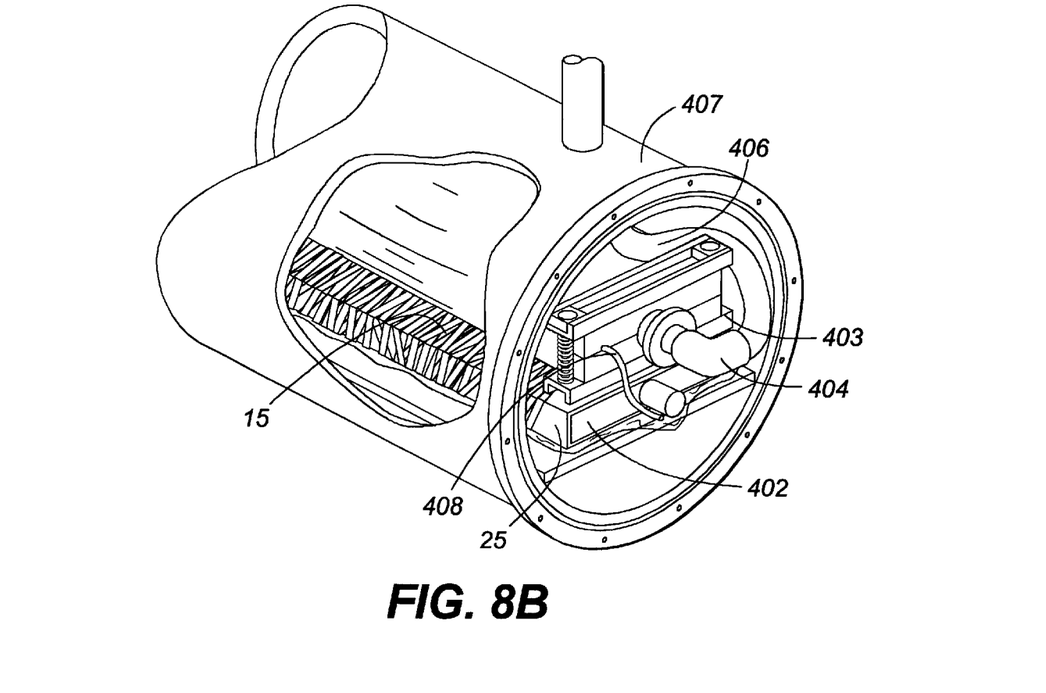
FIG. 8B is a perspective elevationsal view taken in cross-section showing the vacuum bag partially inflated over the sample within the vacuum chamber.

In an additional embodiment of the process for vacuuming and compressing the carbon fiber weave or sample 15 to form the completed composite, shown in FIGS. 8A and 8B, primarily for use with the mandrel 25, once the carbon fiber weave 15 has been wound about the mandrel 25, the mandrel thereafter is applied within a vacuum bag 400 having a first or dummy end 401 and a second or primary end 402 (FIG. 8A). The vacuum bag 400 typically is formed from a plastic bag material such as nylon or polyethylene, including, for example, WRIGHTLON® or IPPLON® nylon bagging films manufactured by Airtech International, Inc. or similar airtight, sealable bag material, and its ends generally are sealed with vacuum tape and clamps 403 to render the bag airtight. As shown in FIG. 8B, a vacuum nozzle 404 is received within the clamps 403 at the primary end 402 of the bagged mandrel. The vacuum nozzle 404 is connected to an air or vacuum line 406 for a vacuum chamber 407 for drawing or vacuuming the air from within the bag, and electrical connections 408 are made to the heating elements within the mandrel.

The mandrel sealed within its vacuum bag is then placed within the vacuum chamber 407 (FIG. 8B), and a vacuum is drawn both on the vacuum chamber and on the vacuum bag. By drawing a vacuum on the bag and the chamber, the bag is caused to float above the carbon fiber weave or sample. As a result, as air is drawn from within the weave, to evacuate the air pockets and air bubbles therefrom, the bag is kept off of the carbon fiber weave to create a space to allow such air to be vacuumed out. Typically, a vacuum is pulled on both the chamber and the bag for approximately 20 minutes to one and one-half hours, depending on the length of the cure life of the resin material applied to the weave. The system further is monitored to detect a rise in temperature of the carbon fiber weave of up to approximately 100–120° F. that would indicate the start of curing of the resin material.

Once it is determined that the sample has been sufficiently vacuumed and is beginning to cure, the vacuum in the chamber is reduced and the pressure in the chamber increased to approximately 15–65 psi, although higher pressures can also be generated if desired. so that there is a pressure differential between the chamber and the bag, causing the bag to compress tightly about the carbon fiber weave so as to apply pressure thereto. At the same time, the heating elements within the mandrel are actuated so that the carbon fiber weave is heated as pressure is applied. Typically, a pressure of between 15 psi to approximately 65 psi will be applied to the weave by the bag during the curing process, which typically will be approximately two hours at approximately 200°–220° F., although the actual cure times and temperatures further will vary based on the curing properties of the resin material used and the temperatures and pressures applied. The system is continuously monitored to detect the completion of the curing process and prevent overheating of the sample. After curing, the composite material is removed from the vacuum chamber, cut off the mandrel and thereafter finished as discussed above.

It will be understood by those skilled in the art that while the present invention has been disclosed with reference to preferred embodiments discussed above, various modifications, additions and changes can be made thereto without departing from the spirit and scope of the invention as set forth in the following claims.

What is claimed is:

1. A method of making a carbon fiber composite material, comprising the steps of:

formig a carbon fiber sample from a series of carbon fibers and a resin material applied to the carbon fibers;

as the carbon fiber sample is formed, randomly altering the carbon fiber sample to disrupt any pattern being formed to the carbon fiber sample and insure the composite material will have a non-uniform, random appearance, wherein the step of randomly altering the carbon fiber sample comprises introducing physical disruptions to the formation of the sample, selected from the group consisting of varying rates at which the fibers are applied, introducing pieces of fibrous materials on the fibers of the sample, varying the thickness of the fibers forming the sample, varying the tension on the fibers as the fibers are formed into the sample, varying the amount of resin applied to the sample, varying the viscosity of the resin applied, altering the topography of the sample, altering the application of the fibers forming the sample, varying the sizes of the fibers, wrapping the sample, and varying the tightness of the sample;

vacuuming the carbon fiber sample to remove air from the carbon fiber sample; and applying pressure to the carbon fiber sample and curing the resin applied to the carbon fiber sample to form a solid carbon fiber composite.

2. A method of making a carbon fiber composite material, comprising the steps of:

forming a carbon fiber sample from a series of carbon fibers and a resin material applied to the carbon fibers, wherein the step of forming the carbon fiber sample comprises applying a resin to a series of carbon fibers and winding the carbon fibers about a mandrel;

as the carbon fiber sample is formed, randomly alter the carbon fiber sample to disrupt any pattern being formed to the carbon fiber sample and insure the composite material will have a non-uniform, random appearance;

vacuuming the carbon fiber sample to remove air from the carbon fiber sample; and applying pressure to the carbon fiber sample and curing the resin applied to the carbon fiber sample to form a solid carbon fiber composite.

3. The method of claim 1 and wherein the step of forming a carbon fiber sample comprises depositing multiple layers of carbon fibers along a layout tray stacked on one another.

4. The method of claim 1 and wherein the step of applying pressure comprises the steps of inflating a bladder, pressing an upper mold plate against the carbon fiber sample as the bladder is inflated, and compressing the carbon fiber sample between the mold plate and a lower mold plate as the resin material applied to the carbon fiber sample is cured.

5. The method of claim 1 and further including the step of finishing the carbon fiber composite material, comprising planning the carbon fiber composite material, cutting the carbon fiber composite material into pieces, sanding the pieces and attaching the pieces to form a product having a unique, non-uniform appearance.

6. The method of claim 1 and wherein the step of forming a carbon fiber sample comprises moving a fiber distribution system in a reciprocable motion along a layout tray and depositing a series of carbon fibers onto the layout tray.

* * * * *